Feb. 9, 1937.  E. J. MULLEN  2,070,235

PRODUCTION OF SULPHUR DIOXIDE

Filed Sept. 8, 1932

INVENTOR
Edwin J. Mullen.
BY
ATTORNEY

Patented Feb. 9, 1937

2,070,235

UNITED STATES PATENT OFFICE 2,070,235

PRODUCTION OF SULPHUR DIOXIDE

Edwin J. Mullen, New Rochelle, N. Y., assignor to General Chemical Company, New York, N. Y., a corporation of New York Application September 8, 1932, Serial No. 632,091

16 Claims. (Cl. 75—9)

This invention is directed to methods and apparatus for roasting finely divided sulphide ores, flotation concentrates and the like, and more particularly for roasting finely divided pyrites ores or flotation concentrates, to desulphurize the same and to produce sulphur dioxide for use in the manufacture of sulphuric acid.

Generally speaking, the present practice in pyrites fines roasting includes the use of mechanically operated multiple hearth constructions, such, for example, as the well known MacDougal, Herreshoff, and Wedge burners, and while such burners provide effective roasting, the complicated construction and operation thereof involve considerable initial and maintenance expense.

As distinguished from the "bed" roasting operation of these burners, it has been suggested to roast the fines while in gaseous suspension, whereby the fines are either injected into a roasting chamber in suspension in the oxidizing gas, or are showered downwardly into the roasting chamber wherein the fines encounter cross or counter currents of suspending gas.

Suspension roasting is best applicable when the fines are in a very finely divided state, e. g. as flotation concentrates, and this method presents the notable advantage over the mechanical multiple hearth operation of considerably lowering the cost of production, by reason of the elimination of the involved and expensive rabbling and other apparatus inherent in the construction and operation of the mechanical burners. In the practice of suspension roasting, however, and particularly as applied to roasting pyritic fines, difficulties are encountered which must be overcome before the theoretical advantages of this type of operation are practically available.

The more serious difficulties arising in connection with suspension roasting of sulphide fines comprise scar formation on the walls of the roasting chamber, and incomplete desulphurization of the ore. So-called "scarring", or formation of relatively large bodies of partly desulphurized ore or clinker on the walls of the roasting chamber, has been generally attributed to the tendency of iron pyrites to sinter during an intermediate stage of the roasting operation. While in this intermediate state of desulphurization, the sintered or partly sintered ore tends to adhere to the walls of the roasting chamber, and in comparatively short intervals, accretions are built up which, from time to time fall to the bottom of the furnace by their own weight, or are of necessity manually gouged off the walls periodically. In either event, wear and tear on the apparatus is excessive and plant operations are seriously hampered by the shutdowns required to clean down the furnace walls. Furthermore, scarring is responsible for poor desulphurization, since large quantities of undesulphurized ores are included in the accretions, and pass out of the furnace as such. Aside from the scarring aspect, suspension roasting presents problems with respect to ore feed, dispersion of ore in the roasting chamber, regulation of the air supply and with general control of operations in order to effect good roasting. such problems involving scarring and poor desulphurization have been well recognized in the art, and various improvements have been made, the chief purposes of which have been to eliminate, or at least partially overcome such difficulties.

The principal object of the present invention comprises the provision of a process by which finely divided sulphide ores may be roasted by suspension methods in such manner as to overcome scarring and to effect a substantially dead roast of the ore particles. The invention also aims to provide apparatus by which the improved process may be successfully practiced.

Among important features of the present method for roasting sulphide ores in suspension are the construction of the combustion chamber designed so as to make possible the most efficient utilization of heat generated in the reaction, the manner of injecting the ore into the top of the combustion chamber so as to effect a relatively uniform distribution of fine ore particles over the major portion of the area of the upper end of the combustion chamber while at the same time avoiding contact of any material quantities of ore with the hot walls of the combustion chamber, countercurrent movement of ore and air or other oxidizing gas through the combustion chamber, the control of the quantity and velocity of the countercurrent stream of air, and the utilization of radiant heat of the cinder to aid in maintenance of proper roasting conditions in the combustion chamber.

According to one preferred embodiment, the process of the invention involves preferably initial drying and preheating of the sulphide fines, such as flotation concentrates, by waste heat of the roasting operation, so that ignition of the ore particles on introduction into the combustion chamber is hastened. After preheating, the ore is run into injector mechanisms located near the top of the vertical sides of the burner which mechanisms inject the fines into the combustion chamber, horizontally or preferably at an upwardly inclined angle, in such manner that the incoming ore is not directed into contact with the heated walls of the combustion chamber and so that there is formed a more or less evenly distributed dispersion of ore over the major portion of the entire area of the upper end of the combustion chamber. An important feature of the invention comprises the design of the combustion chamber itself and the latter is preferably proportioned so that the velocity of the gas travel through the combustion chamber may be reduced to a minimum, and additionally so that most efficient utilization may be had of heat generated in the reaction. In the preferred embodiments of the invention, the combustion chamber is cylindrical and has a vertical dimension substantially equal to the diameter. On formation of the dispersion of fines in the upper end of the combustion chamber, the ore particles ignite, and are permitted to drop without turbulence through the combustion chamber at a rate substantially the same as the rate of free fall of the particles under the influence of gravity. When dropping through the combustion chamber, the particles pass through a roasting atmosphere increasingly rich in oxygen, such atmosphere being afforded by a relatively slowly upwardly flowing stream of air or oxidizing gas. The quantity of oxidizing gas and the velocity of the upwardly directed gas stream are so regulated as to provide sufficient oxygen to effect substantially complete oxidation of ore and to avoid any material interference of the free gravity fall of the ore particles. Conditions are so controlled that at the bottom of the combustion chamber there is a zone containing substantially all air and substantially no sulphur dioxide or other gas. In this zone, oxidation of the iron is completed, thus providing a substantially dead roast of the ore particles. The area of the bottom of the combustion chamber is relatively large, and the cinder collecting thereon is discharged from the combustion chamber slowly so as to utilize, to a large extent, the heat of the hot cinder, which heat is radiated upwardly, heating the air entering the combustion chamber at points immediately above the surface of the cinder bed, transmitting heat to the reaction taking place in the reaction chamber above, and facilitating maintenance of proper roasting conditions therein. The iron oxide cinder is ultimately discharged from the bottom of the combustion chamber, and sulphur dioxide gases are withdrawn from the top.

Numerous advantages of the invention will be apparent from the following description taken in connection with the accompanying drawing, in which,—

Figure 1:
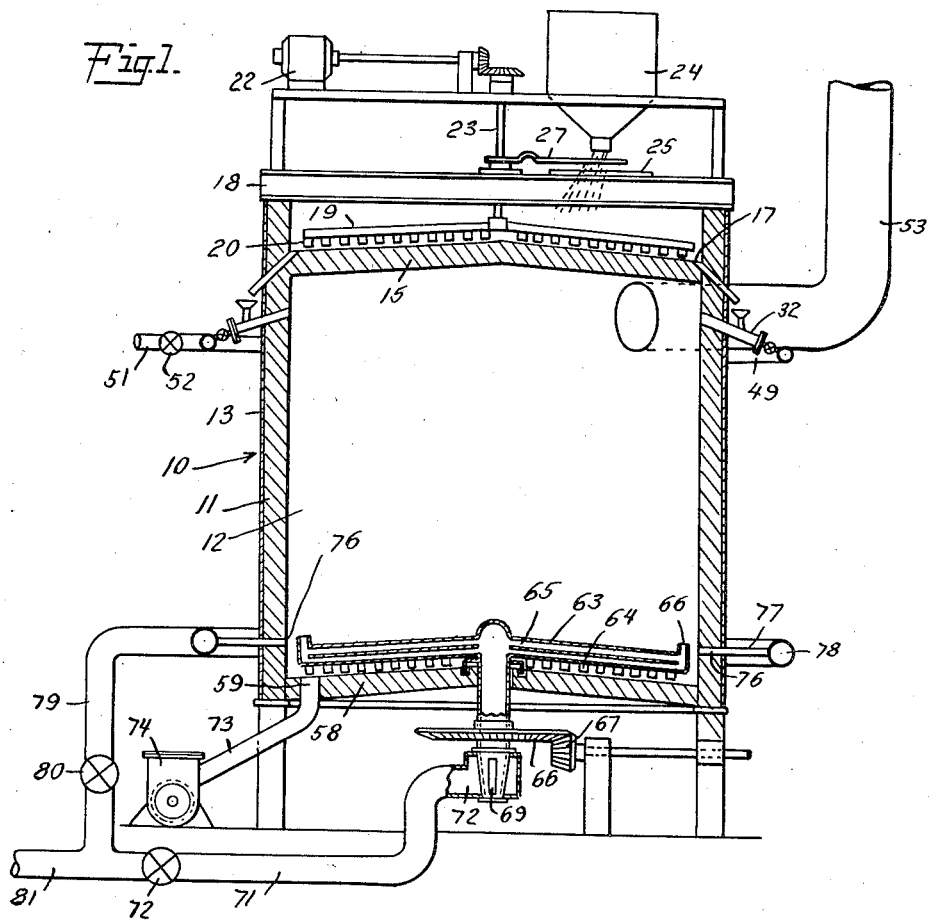
Fig. 1 is a vertical section of a burner for carrying out the improved process.

Referring particularly to Fig. 1 of the drawing, numeral 10 designates generally a shaft burner comprising a shell 11 constructed of suitable refractory material, such as firebrick, and defining a roasting chamber 12 of cylindrical cross-section. Surrounding shell 11 is a steel casing 13 which acts as a protective reinforcement. The upper end of the combustion chamber is closed off by a crown 15 the top side of which forms a drying and preheating hearth 17. The vertical, cylindrical shell 11 and casing 13 project upwardly beyond the crown 15, and carry a steel framework 18 which in turn supports ore feeding and rabble mechanism for the drying hearth.

The surface of hearth 17 is slightly cone-shaped and slopes downwardly toward the shell of the burner. Mounted above the hearth are rabble arms 19 having downwardly projecting plows 20 pitched to work ore gradually toward the circumference of the drying hearth. Arms 19 are rotated by a motor 22 through shaft 23 supported in bearings so as to maintain the lower ends of plows 20 properly spaced with respect to the surface of the drying hearth. An ore bin 24 mounted on framework 18 discharges ore onto a platform 25 from which ore is intermittently dropped onto approximately the center of hearth 17 by a sweep 27 fixed to shaft 23.

Figure 2:
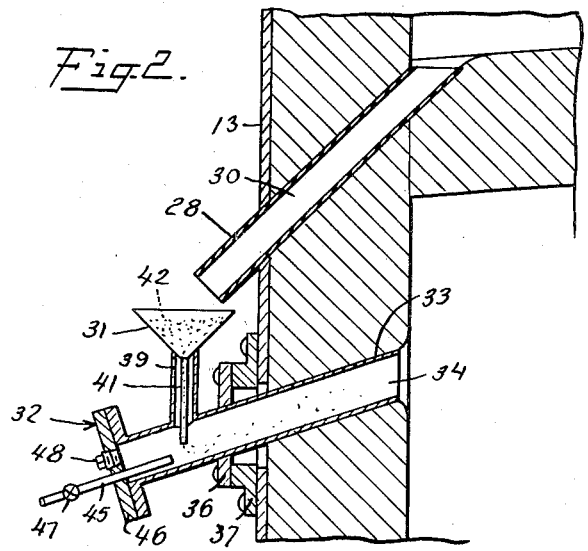
Fig. 2 is an enlarged, vertical section of preferred type of ore feeding mechanism.

Fig. 2 of the drawing shows an enlarged section of a preferred form of mechanism for feeding finely divided ore into the combustion chamber 12. This device includes a tube 28 providing a downwardly directed ore conduit 30 passing through the shell of the burner. The top of the conduit is flush with the surface of the drying hearth, and the lower end of tube 28 feeds ore into a funnel 31 constituting a part of an ore injector indicated generally by the reference numeral 32. The injector comprises principally a metallic pipe section 33 the inner end of which is set into the shell of the burner near the upper end of the combustion chamber, tube 33 forming an ore inlet conduit 34. The tube 33 is held securely in position by a circular plate 36 and a flange 37 bolted to the steel shell 13. In the preferred construction, the axis of tube 33 is directed upwardly at an angle of about 25° to the horizontal.

Projecting upwardly from the top side of the lower end of tube 33, and supported thereby, is a vertical pipe 39 in the top of which rests funnel 31. Extending downwardly through the pipe 39 is a tube 41 through which the sulphide fines are drawn from the funnel 31 into the inlet conduit 34. The funnel is provided with a screen 42 preventing admission to the funnel of any lumps which might clog tube 41. A steam or gas inlet pipe 45 passes through the plate 46 closing the bottom of conduit 34 and terminates short of the discharge end of tube 41. Admission of steam or other gas to the pipe 45 is controlled by a valve 47. Plug 48 affords means for cleaning out conduit 34 should the same become stopped up.

The burner may be provided with any number of injectors 32. In the present embodiment of the invention the two injectors shown in Fig. 1 are diametrically opposed. In some instances it may be desirable to employ three or more injectors, in which case the injectors are spaced evenly about the circumference of the shell. Surrounding the burner near the injectors is a bustle 49 for supplying gas to the injector tubes 45, the bustle being connected to a gas supply through pipe 51 controlled by valve 52.

A gas main 53 for withdrawing gaseous products of combustion from the chamber 12 opens into the latter just beneath the crown 15.

Figure 3:
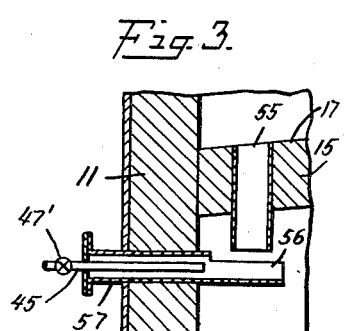
Fig. 3 is an enlarged, vertical section of a modified form of ore feeding apparatus.

Fig. 3 shows in section a modified form of ore feeding mechanism. In this instance, the feeding tubes 55 positioned at the periphery of the hearth 17 pass vertically downward through crown 15 and serve to feed ore onto a semi-cylindrical shelf 56 formed by cutting off the upper half of the end of a tube 57. The latter is preferably made of refractory material, and extends horizontally through the shell 11 as indicated on the drawing. In this injector, the gas inlet pipe 45' is positioned axially in tube 57, and does not project over the shelf section 56.

The bottom 58 of the combustion chamber pitches downwardly toward the shell 11 and is provided on the circumference thereof with one or more cinder outlets 59. The bottom 58 has a central opening to accommodate a hollow rotatable shaft 60 carrying rabble arms 63 each having a plurality of downwardly extending plows 64 for feeding cinder into openings 59. Rabble arms 63 are constructed so as to include longitudinal conduits 65 opening into the interior of hollow shaft 60 to permit passage through the arms of cooling air which is discharged into the combustion chamber, through openings 66. Shaft 60 is supported by suitable bearings, and is rotated by a gear 66 meshing with a pinion 67 which in turn is driven from a source of power not shown. Discharge of cinder by rabbles is not essential. The furnace may be built with a hopper-shaped bottom having a screw conveyor or other suitable means for discharging cinder from the combustion chamber.

Cooling air is introduced through slots 69 into the shaft 60, from an air inlet pipe 71 terminating in a casing 72 surrounding the lower end of the shaft. The quantity of air passing through pipe 71 is controlled by a valve 72.

Cinder discharged from the combustion chamber through outlet 59 runs through pipe 73 into a closed chamber 74 having therein a screw conveyor or other suitable means for discharging cinder without admitting air to the combustion chamber.

Substantially all of the air required in the process to supply oxygen for the roasting reaction is introduced into the combustion chamber through a plurality of ports 76 equally spaced about the shell 11 and opening into the combustion chamber above the surface of the bottom 58, and approximately at the level of the tops of the rabble arms 63. The ports 76 communicate through short pipe sections 77 with a circular bustle 78 surrounding the burner. Air is introduced into the bustle from an inlet pipe 79 having a control valve 80 and connecting with an air main 81.

The invention is applicable to the roasting of finely divided sulphide ores such as iron pyrites, pyrrhotite, zinc sulphide and arsenopyrite, but for convenience the operation of the process will be described in connection with the roasting of iron pyrite flotation concentrates.

A supply of concentrates, of a particle size that substantially 100% will pass a 60 mesh screen, is maintained in the bin 24 by suitable conveyor or elevator mechanism, not shown. Before roasting is begun, the combustion chamber is preheated to a temperature above the ignition point of the particular ore to be roasted, as by the use of oil burners inserted through conveniently located work-holes, not shown. When the desired degree of preheat is obtained in the combustion chamber 12, the motor 22 is started and rabble arms 19 and sweep 27 may be rotated at a rate of say one revolution in two minutes. Concentrates run continuously out of the bin 24 onto platform 25, and on each revolution of shaft 23 a regulated quantity of ore is swept off the platform to approximately the center of hearth 17.

During rotation of the rabble arms 19, the concentrates are worked gradually over the heated surface of hearth 17 and into the upper ends of the tubes 30. When roasting is well under way, at the above noted rate of rotation of rabble arms 19, the ore is preheated during passage over the drying deck to approximately 400-500° F. This preliminary heating serves to dry the concentrates, thus facilitating the formation of a more satisfactory dispersion of the ore in the combustion chamber, and at the same time heats the ore to temperatures such that ignition takes place shortly after injection into the heated combustion chamber.

Flotation concentrates are usually in a wet or damp condition, and hence preferably require drying before roasting by suspension methods. In prior methods for suspension roasting of concentrates, it has been necessary to provide additional apparatus to dry the ore sufficiently to permit formation of a good suspension in the roasting chamber. By the present method, drying and preheating of the concentrates on the hearth 17 effects a saving in capital investment involved in the provision of separate drying equipment, utilizes waste heat of the roasting reaction taking place in the combustion chamber 12, and preheats the ore to such an extent that ignition takes place shortly after introduction into the roasting zone. While desirable, it is to be understood that preheating of the concentrates is not essential to the successful operation of the present process.

Preheated ore runs in a substantially steady stream through conduit 30 onto the screen 42 in funnel 31. The concentrates are initially finely divided, and the screen is utilized simply as a precaution to avoid passage of occasional lumps into the injector 32.

The next phase of the process comprises the dispersion of the ore in the combustion chamber in a substantially horizontal plane, as near the underside of crown 15 as convenient. A satisfactory uniform distribution of ore particles may be adequately effected by the use of the injector mechanisms shown in either Fig. 2 or Fig. 3 of the drawing, although the injector of Fig. 2 is preferred. Referring to the latter, it will be recalled that the axis of passage 34 is upwardly inclined at an angle of about 25° to the horizontal. Efficient dispersion of the ore in the roasting chamber is not dependent upon any particular degree of inclination of the axis of the inlet conduits 34, and tube 33 may therefore be horizontally disposed if desired. However, to secure the best roasting, it is not desired to feed the ore into the roasting chamber in such manner that the initial travel is in a downward direction. In the presently described embodiment of the invention, the ore is injected by means of gas introduced into the injector through gas inlet tube 45. Air, steam or other inert gas are suitable for this purpose, although it is preferred to employ steam. When using the latter, steam at pressures of about 15 lbs. per square inch is provided in the bustle 49 surrounding the burner. The valves 47 in tubes 45 are opened, and steam admitted to the charging passages 34, the temperature of the steam at such pressures being in the neighborhood of about 250° F.

From an inspection of Fig. 2, it will be seen that the tube 45 terminates outwardly of the bottom end of tube 41. With steam entering through tube 45, by the combined action of gravity and the suction effect produced by the steam, ore is drawn out of the funnel 31 thru tube 41 and into the passage 34. On account of the steam pressure, the ore particles are initially charged into the combustion chamber in an upward direction. In the present example, the diameter of the combustion chamber is approximately 16 feet, and working with steam at the above-noted pressure, a considerable portion of the ore particles is carried approximately three-quarters of the way across the combustion chamber. Since the initial path of movement of the ore particles is upward at approximately the angle indicated, numerous particles at the top of the arc of travel approach the underside of the crown 15 of the combustion chamber. As each of however many injectors may be employed operates in the same manner, it will be seen that large portions of the ore introduced by each injector, by the time such portions drop to approximately the level of the inlet ends of the injectors, have traveled a considerable distance horizontally in the burner chamber, a substantial quantity of the particles, as above noted, having moved horizontally a distance equal to about three-quarters of the diameter of the combustion chamber. Although it is desirable to cause considerable portions of the ore particles to travel a relatively large distance horizontally across the combustion chamber, the injectors should be so operated that ore particles from one particular injector do not strike the opposite wall. In this manner there is formed in the combustion chamber approximately at or slightly below the level of the inlet ends of passages 34, a relatively evenly distributed dispersion of finely divided ore, the ore particles lying in a substantially circular area of a diameter appreciably less than that of the roasting chamber. When operating in accordance with the method described, the number of ore particles striking the hot walls of the upper end of the combustion chamber is negligible, and troublesome scar formation on the walls of the roasting chamber is avoided.

Good dispersion of the ore in the upper end of the combustion chamber may also be obtained when using the injector shown in Fig. 3 of the drawing. In this modification, the dried and heated ore drops through channel 55, and builds up in a small pile on the semi-cylindrical shelf 56 on the end of tube 57. The valve 47' is adjusted, as noted in connection with Fig. 2, so that the steam enters tube 57 at pressures of about 15 lbs. per square inch. The steam issuing from the end of nozzle 45' blows the fines off the shelf 56, and there is formed in the upper end of the roasting chamber a dispersion of ore very much of the same nature as already described. In this case, however, the plane of the dispersion is somewhat lower than the level of the injectors. The continuous supply of ore on shelf 56, together with the injecting action of the steam, prevents the discharge of roaster gases through passages 55.

The injector mechanisms shown in the drawing have been illustrated for the purpose of showing preferred and satisfactory ways of creating the dispersion of fines in the upper end of the reaction chamber. Other methods of forming the dispersion may be employed. For example air, or an inert gas not detrimental to the roasting operation may be used in place of steam. Further, the formation of the dispersion may be effected by suitable mechanical means alone, not employing a gas of any form. The important thing is the creation of a proper dispersion of ore near the top of the roasting chamber, and not so particularly in the manner of effecting the formation.

Once distributed uniformly over an area something less than that of the combustion chamber, the dispersed particles drop freely under the action of gravity toward the bottom of the reaction chamber. As observed, the combustion chamber is preferably designed so as to provide the smallest area per unit of volume. The combustion chamber is most conveniently made cylindrical, and therefore, in accordance with the preferred embodiment of the invention, the height of the combustion chamber is substantially equal to the diameter thereof, i. e., in the present example, about 16 feet.

The most efficient burner for roasting sulphide fines is one designed to raise the temperature of the fines to the ignition point and to completely oxidize the ore particles in the shortest possible time. To meet these requirements, it is primarily desirable that the burner be capable of maintaining the temperatures sufficiently high for ignition and combustion, and that the loss of heat be minimized. A combustion chamber proportioned to have a minimum surface per unit of volume will give greater efficiency from the standpoint of conservation of heat. Where the burner is cylindrical in form, one having a diameter equal to the height, will have the least surface per unit of volume. A furnace of this description, as compared with a cylindrical furnace having a height substantially greater than the diameter, will lose less heat through the chamber walls for the reason that aside from having a smaller outer surface area, the lower velocities of the gases involved in the roasting operation minimize loss of heat by convection. Inasmuch as the rapidity of raising the temperature of the incoming fines to the required ignition point is dependent upon the quantity of heat absorbed by the fines, which in turn is dependent upon the amount of heat radiated from the hot walls or other radiating bodies within the furnace, it will be seen that the more efficiently the heat in the furnace is conserved and utilized in the roasting reaction, the more rapid will be the combustion of the ore and the more thorough the roast.

Since the burner chamber is constructed to give the smallest surface area per unit of volume, thus increasing the wall temperature and the reflection of radiant heat, in the more desirable embodiments of the invention a cylindrical burner having a diameter approximately equal to the height is the preferred design, as it practically allows maximum utilization of available heat. Further, this type of combustion chamber may be constructed with a minimum consumption of brick and steel. While such design of the roasting chamber is preferred, it is to be understood that the diameter of the chamber may, in some instances, be somewhat less than the height, and the diameter of the chamber may also exceed the height by a substantial amount. Preferably the diameter of the chamber is not less than the height.

The total quantity of air, or other oxidizing gas, necessary to support the oxidation reaction is introduced into the reaction chamber at the bottom thereof through ports 76, a small quantity of air entering through the ends 66 of the rabble arms 63. The valve 72 in the conduit 71 is opened to allow only enough air to pass through the hollow shaft 60 and rabble arms 63 to cool the same and prevent overheating. In all modes of operation, by far the greater portion of air enters through ports 76. Even in a situation where air might be employed for creating dispersion of ore in the top of the combustion chamber, not more than about 0.5% of the total air required for oxidation would be introduced through the tubes 45. For practical purposes, it may therefore be considered that all of the air is introduced into the combustion chamber at the lower end thereof and rises through the combustion chamber.

Following formation of the dispersion of finely divided ore in the upper end of the combustion chamber, as previously described, a subsequent important feature of the invention comprises the fall of the ore particles through a roasting atmosphere increasingly rich in oxygen. This atmosphere is provided by the introduction of air into the bottom of the combustion chamber. The ore particles drop through the combustion chamber at a rate substantially the same as that of similar particles falling under the influence of gravity. The purpose of introducing the air into the bottom of the combustion chamber is to provide in the downward direction an atmosphere increasingly rich in oxygen, and the upwardly flowing stream of oxidizing gas does not move at such velocity as to appreciably retard the descent of the ore particles. Substantially free unretarded fall of the ore particles may be had in the present method since the relatively large diameter of the combustion chamber permits upward movement of the oxidizing gas stream at a low velocity. In the preferred method of operation, the air pressure in air inlet pipe 81 is about 6–8 ounces, and the velocity of the rising stream of air through the combustion chamber is preferably about 0.3 foot per second, and to obtain the best results, should be not more than about 0.6 foot per second.

Because of the relatively extensive horizontal travel of the ore particles in the upper end of the combustion chamber following injection, the particles rapidly become preheated to such extent that at about the time the particles begin to descend through the combustion chamber, the ignition temperature is reached and the ore particles ignite. In the upper zone of the reaction chamber, wherein the temperature is not far below about 1550° F., the feeble atom of sulphur distils off and is oxidized to sulphur dioxide. From the above description of the manner of initially creating the ore dispersion it will be recalled that no material amounts of ore particles in the upper end of the reaction zone contact the hot walls of the reaction chamber. Accordingly, in the first stages of the roasting operation and during the intermediate period in which the ore particles are in the sticky state and would tend to adhere to the walls, the ore particles do not come in contact with the walls because of the manner of dispersing the ore and because of the absence of the combustion chamber of turbulent gas currents, and hence scarring is substantially completely overcome. As the ore particles drop through the combustion chamber roasting proceeds rapidly, the temperature of the roasting operation as a whole being in the neighborhood of 1550° F., in the particular example in which the combustion chamber is approximately 16 feet in height, oxidation of sulphur is substantially complete at a distance of about 30 inches from the top of the cinder bed on the bottom 58. In this lowermost zone, the ore particles enter into an atmosphere containing substantially all hot air and comparatively no sulphur dioxide. The particles become incandescent, indicating substantial completion of oxidation of the iron, and in this stage oxidation of the cinder becomes substantially complete. During the drop of the ore particles through the reaction chamber, the sulphur dioxide formed is substantially immediately removed from the ore particles, and as the latter get poorer in sulphur, the particles drop into an atmosphere increasingly rich in oxygen and oxidation of the ore more readily proceeds to completion.

The cinder falls onto the bottom of the combustion chamber 58, and the lower ends of the plows 64 and rabble arms 63 are so adjusted with respect to the upper surface of the bottom 58 as to facilitate the maintenance on the bottom of the combustion chamber of a bed of cinder of appreciable thickness, say 3 to 4 inches. As the area of the cinder bed is relatively extensive and the temperature of the cinder being around 1600° F., large quantities of heat are radiated from the cinder bed upwardly into the combustion zone and toward the walls of the reaction chamber. The hot cinder acts to heat to a high degree the air entering the combustion chamber through ports 76, thus raising the temperature of the air to facilitate relatively complete oxidation of the ore particles falling through the zone immediately above the bottom of the combustion chamber, which zone, as noted, comprises substantially pure air and little or no sulphur dioxide.

Rabble arms 63 are rotated at a suitable rate, and cinder is ultimately discharged from the bottom of the combustion chamber through one or more air-locked outlets 59. The cinder is finely divided, free-flowing, and is substantially $Fe_2O_3$.

Sulphur dioxide gases are withdrawn from the combustion chamber through the conduit 53, and may be used, for example, in the manufacture of sulphuric acid. The sulphur dioxide content of the burner gas may be regulated as desired by adjusting the amount of air fed into the combustion chamber, as is known by those skilled in the art. Gases containing 10–15% sulphur dioxide may be readily made by the present process.

The process of the invention is remarkably efficient both with respect to the elimination of scarring on the walls of the reaction chamber and the degree of desulphurization of the ore obtained. In one instance continuous operation over a considerable period of time when roasting an iron pyrites flotation concentrate containing slightly in excess of 51% sulphur and about 2½% zinc, on a daily average, about 28,490 lbs. of ore per day were charged into the furnace. When regulating the air supply so as to produce about a 10.5% sulphur dioxide gas, the cinder produced amounted to about 17,930 lbs., of average sulphur content of 0.49%. No scarring on the furnace walls was apparent.

The absence of scarring on the walls of the reaction chamber is thought to be the result of the manner in which the ore is initially charged into the combustion chamber and the conditions existing therein during subsequent roasting of the ore particles. As hereinbefore noted, the fines are charged into the upper end of the reaction chamber so that substantially none of the ore particles strike the chamber wall opposite a particular injector, the dispersion of ore particles extending over a circular area of a diameter somewhat less than that of the combustion chamber itself. The ore particles of the dispersion then drop substantially at the rate induced by gravity, and since the upwardly rising air current moves slowly turbulent gas currents are not set up in the roasting chamber, and the ore particles, while in a state conducive to scarring, do not come in contact with the hot walls of the combustion chamber. Consequently, scarring on the furnace walls is reduced to a minimum.

Proper oxidation of sulphide ores requires a temperature sufficiently high to produce the reaction between oxygen and sulphur. An additional requirement for proper oxidation is a constant and abundant supply of air in immediate contact with the material to be oxidized, because of the fact that the oxidizing power of air is lowered materially when diluted with the gaseous furnace products. Accordingly, the more rapidly the gaseous products are removed and replaced by pure air, the more rapid and complete the roast will be. Another element of successful suspension roasting relates to the fineness to which the ore is ground, the more finely divided the ore, the greater will be the surface exposed to the oxidizing influence, affecting the speed and completeness of the roast. The process of the present invention provides for all the conditions required for a complete and rapid oxidation of ore.

I claim:

1. The method of roasting metal sulphide fines to produce sulphur dioxide which comprises preheating the fines by the heat of the roasting reaction, injecting the preheated fines into the upper end of a combustion zone, the combustion zone being heated to temperatures at least above the ignition point of the fines, said fines being injected into the combustion zone at velocity so as to cause at least a portion of the fines particles to travel horizontally across the combustion zone a distance not less than about one-half the horizontal dimension thereof and to effect fall of fines through the combustion zone without contact of any substantial quantities of fines with the heated walls of the combustion zone, causing fines particles to drop through the combustion zone countercurrent to a stream of air, regulating the quantity and velocity of the stream of air so as to provide sufficient oxygen to effect relatively complete oxidation of the fines and to avoid interference with the substantially free fall of the fines particles through the combustion zone, permitting a substantial body of cinder to collect in the bottom of the combustion zone whereby heat is radiated into the latter, withdrawing gaseous reaction products from the top of the combustion zone, and discharging cinder from the bottom thereof.

2. Apparatus for roasting metal sulphide fines comprising a vertically disposed substantially unobstructed combustion chamber having a large horizontal dimension with respect to the height and having horizontal dimensions taken at right angles substantially equal, means for radially introducing into the upper end of the combustion chamber sulphide fines and causing the fines particles to initially move horizontally through the combustion chamber for a substantial distance, means for introducing oxidizing gas into the bottom of the combustion chamber, means at the bottom of the combustion chamber for discharging cinder therefrom, and means for withdrawing gaseous products of combustion from the top of the combustion chamber.

3. Apparatus for roasting metal sulphide fines comprising a combustion chamber having a relatively horizontal top, means for passing sulphide fines over said top whereby the fines are heated by heat generated in the roasting reaction, an injector including a fines inlet conduit passing through the vertical wall of the combustion chamber, means for supplying heated fines to the injector, means for injecting the fines into the top of the combustion chamber in such manner as to cause the fines to initially move horizontally through the reaction chamber a substantial distance, means for passing a stream of oxidizing gas upwardly through the combustion chamber, means at the bottom of the combustion chamber for discharging cinder therefrom, and a gas outlet at the top for withdrawing gaseous products of combustion.

4. Apparatus for roasting metal sulphide fines comprising a substantially cylindrical, vertically disposed combustion chamber of substantially equal height and diameter and having a substantially horizontal top, means for feeding sulphide fines onto the center of the top, means for working the fines gradually over the surface of the top toward the periphery thereof, a fines feeding conduit in the side of the combustion chamber near the top thereof, said conduit being upwardly inclined and opening into the combustion chamber at a point higher than the inlet end of the feeding conduit, means for feeding heated fines into the inlet end of the feed conduit, means for injecting gas into the feed conduit to charge fines into the combustion chamber and cause the fines to move initially horizontally through the combustion chamber for a substantial distance, means for passing a stream of oxidizing gas upwardly through the combustion chamber, means in the bottom of the combustion chamber for discharging cinder therefrom, and means at the top of the combustion chamber for withdrawing gaseous products of combustion.

5. Apparatus for roasting metal sulphide fines comprising a combustion chamber having a relatively horizontal top, means for passing sulphide fines over said top whereby the fines are heated by heat generated in the roasting reaction, an injector including a fines conduit passing through the vertical wall of the combustion chamber, means for supplying heated fines to the injector, means for injecting the fines into the combustion chamber in such manner as to cause fines to fall from substantially the top of the combustion chamber to the bottom thereof, means for passing a stream of oxidizing gas upwardly through the combustion chamber, means at the bottom of the combustion chamber for discharging cinder therefrom, and a gas outlet at the top for withdrawing gaseous products of combustion.

6. Apparatus for roasting metal sulphide fines comprising a vertically disposed combustion chamber having a substantially horizontal top, means for feeding sulphide fines onto the top, means for working the fines gradually over the surface of the top toward the periphery thereof, a fines feeding conduit in the side of the combustion chamber, said conduit being upwardly inclined and opening into the combustion chamber at a point higher than the inlet end of the conduit, means for feeding heated fines into the inlet end of the feed conduit, means for injecting gas into the feed conduit to charge fines into the combustion chamber and cause fines to move through the combustion chamber from substantially the top of the combustion chamber to the bottom thereof, means for passing a stream of oxidizing gas upwardly through the combustion chamber, means in the bottom of the combustion chamber for discharging cinder therefrom, and means at the top of the combustion chamber for withdrawing gaseous products of combustion.

7. The method of roasting metal sulphide fines to produce sulphur dioxide which comprises injecting the sulphide fines into a vertically disposed combustion chamber heated to temperatures above the ignition point of the fines, effecting ignition of the fines, said fines being injected into the combustion chamber at velocity so as to cause at least a portion of the fines to travel horizontally across the combustion chamber a substantial distance and to form a dispersion of fines over a major portion of the upper area of the combustion zone and to prevent contact of any substantial quantities of incoming fines with the heated walls of the combustion zone, and to effect fall of fines through the combustion zone without contact of any substantial quantities of fines with the heated walls of the combustion zone, introducing a stream of air into the bottom of the combustion chamber, causing the fines to drop through the combustion chamber countercurrent to said stream of air, regulating the quantity and volume of the upwardly flowing gas stream so as to provide sufficient oxygen to effect relatively complete oxidation of the fines and to avoid causing contact of any substantial quantities of fines with the side walls of the combustion zone, utilizing heat of relatively oxidized fines within the combustion zone to rapidly raise the temperature of the incoming air introduced at the bottom of the combustion chamber, withdrawing gaseous combustion products from the top of the combustion chamber, and discharging cinder from the lower end thereof.

8. The method of roasting metal sulphide fines to produce sulphur dioxide which comprises injecting the sulphide fines into a vertically disposed combustion chamber heated to temperatures above the ignition point of the fines, effecting ignition of the fines, said fines being injected into the combustion chamber at velocity so as to cause at least a portion of fines to travel with an initially upward component and also to travel initially horizontally across the combustion chamber a substantial distance to form a dispersion of fines in the upper area of the combustion chamber and to prevent contact of any substantial quantities of incoming fines with the heated walls of the combustion chamber, and to effect fall of fines through the combustion zone without contact of any substantial quantities of fines with the heated walls of the combustion zone, introducing a stream of air into the bottom of the combustion chamber, causing the fines to drop through the combustion chamber countercurrent to the said stream of air, regulating the quantity and velocity of the upwardly flowing gas stream so as to provide sufficient oxygen to effect relatively complete oxidation of the fines and to avoid causing contact of any substantial quantities of fines with the side walls of the combustion chamber, withdrawing gaseous combustion products from the top of the combustion zone, and discharging cinder from the lower end thereof.

9. The method of roasting metal sulphide fines to produce sulphur dioxide which comprises injecting sulphide fines into a combustion zone heated to temperatures at least above the ignition point of the fines, said fines being injected into the combustion zone at velocity so as to cause at least a portion of the fines particles to travel with an initially upward component and also to travel horizontally across the combustion zone a substantial distance to form a dispersion of fines in the upper area of the combustion zone and to prevent contact of any substantial quantities of incoming fines with heated walls of the combustion zone, and to effect fall of fines through the combustion zone without contact of any substantial quantities of fines with the heated walls of the combustion zone, causing fines particles to drop through the combustion zone countercurrent to a stream of air, regulating the quantity and velocity of the stream of air so as to provide sufficient oxygen to effect relatively complete oxidation of the fines and to avoid causing contact of any substantial quantities of the fines particles with side walls of the combustion zone, causing cinder to collect in the bottom of the combustion zone whereby heat is radiated into the latter, withdrawing gaseous reaction products from the top of the combustion zone, and discharging cinder from the bottom thereof.

10. The method of roasting metal sulphide fines to produce sulphur dioxide which comprises injecting sulphide fines into a combustion chamber heated to temperatures above the ignition point of the fines and having a large transverse dimension relative to the height, said fines being injected into the combustion chamber at velocity so as to cause at least a portion of the fines to travel horizontally across the combustion chamber a substantial distance and to form a dispersion of fines in the upper area of the combustion zone and to prevent contact of any substantial quantities of incoming fines with the heated walls of the combustion zone and to effect fall of fines through the combustion zone without contact of any substantial quantities of fines with the heated walls of the combustion zone, introducing a stream of air into the bottom of the combustion chamber, causing the fines to drop through the combustion chamber countercurrent to said stream of air, regulating the quantity and velocity of the upwardly flowing gas stream so as to provide sufficient oxygen to effect relatively complete oxidation of the fines and to avoid causing contact of any substantial quantities of fines with the side walls of the combustion zone, withdrawing gaseous combustion products from the top of the combustion chamber, and discharging cinder from the lower end thereof.

11. The method of roasting metal sulphide fines to produce sulphur dioxide which comprises injecting sulphide fines at the periphery of a combustion chamber heated to temperatures above the ignition point of the fines and having a large transverse dimension relative to the height, said fines being injected into the combustion chamber at velocity so as to cause at least a portion of the fines to travel horizontally across the combustion chamber a substantial distance and to form a dispersion of fines in the upper area of the combustion zone and to prevent contact of any substantial quantities of incoming fines with the heated walls of the combustion zone and to effect fall of fines through the combustion zone without contact of any substantial quantities of fines with the heated walls of the combustion zone, introducing a stream of air into the bottom of the combustion chamber, causing the fines to drop through the combustion chamber countercurrent to said stream of air, regulating the quantity and velocity of the upwardly flowing gas stream so as to provide sufficient oxygen to effect relatively complete oxidation of the fines and to avoid causing contact of any substantial quantities of fines with the side walls of the combustion zone, withdrawing gaseous combustion products from the top of the combustion chamber, and discharging cinder from the lower end thereof.

12. The method of roasting metal sulphide fines to produce sulphur dioxide which comprises injecting sulphide fines at the periphery and at the top of a combustion chamber heated to temperatures above the ignition point of the fines and having a large transverse dimension relative to the height, said fines being injected into the combustion chamber at velocity so as to cause at least a portion of the fines to travel with an initially upward component and also to travel horizontally across the combustion chamber a substantial distance and to form a dispersion of fines in the upper area of the combustion zone and to prevent contact of any substantial quantities of incoming fines with the heated walls of the combustion zone, and to effect fall of fines through the combustion zone without contact of any substantial quantities of fines with the heated walls of the combustion zone, introducing a stream of air into the bottom of the combustion chamber, causing the fines to drop through the combustion chamber countercurrent to said stream of air, regulating the quantity and velocity of the upwardly flowing gas stream so as to provide sufficient oxygen to effect relatively complete oxidation of the fines and to avoid causing contact of any substantial quantities of fines with the side walls of the combustion zone, withdrawing gaseous combustion products from the top of the combustion chamber, and discharging cinder from the lower end thereof.

13. The method of roasting metal sulphide fines to produce sulphur dioxide which comprises injecting sulphide fines into a combustion chamber heated to temperatures above the ignition point of the fines and having a large horizontal dimension relative to the height, said fines being injected through a side wall of the combustion chamber in a direction away from the said side wall and at such velocity as to cause at least a portion of the fines to travel horizontally across the combustion chamber a substantial distance before falling through the combustion chamber and to form a dispersion of fines in the upper area of the combustion zone and to prevent contact of any substantial quantities of incoming fines with relatively oppositely disposed heated walls of the combustion zone and to effect fall of fines through the combustion zone without contact of any substantial quantities of fines with the heated walls of the combustion zone, causing the fines to drop through the combustion chamber in such a line of travel that contact of any substantial quantities of fines with walls of the combustion chamber is prevented, maintaining in the combustion chamber, in a condition to prevent causing contact of any substantial quantities of falling fines with side walls of the combustion chamber, a roasting atmosphere increasingly rich in oxygen in the direction of fall of the fines whereby the fines are substantially completely oxidized and sulphur dioxide produced, withdrawing sulphur dioxide from the top of the combustion chamber, and discharging cinder from the bottom of the combustion chamber.

14. The method of roasting metal sulphide fines to produce sulphur dioxide which comprises injecting sulphide fines into a combustion chamber heated to temperatures above the ignition point of the fines and having a large horizontal dimension relative to the height, said fines being injected through a side wall of the combustion chamber in a direction away from the said side wall and at such velocity as to cause at least a portion of the fines to travel horizontally across the combustion chamber a substantial distance before falling through the combustion chamber and to form a dispersion of fines in the upper area of the combustion zone and to prevent contact of any substantial quantities of incoming fines with relatively oppositely disposed heated walls of the combustion zone and to effect fall of fines through the combustion zone without contact of any substantial quantities of fines with the heated walls of the combustion zone, causing the fines to drop through the combustion chamber in such a line of travel that contact of any substantial quantities of fines with walls of the combustion chamber is prevented, maintaining in the combustion chamber, in a condition such as to prevent causing contact of any substantial quantities of falling fines with side walls of the combustion chamber, a roasting atmosphere increasingly rich in oxygen in the direction of fall of the fines whereby the fines are substantially completely oxidized and sulphur dioxide produced, causing a substantial body of cinder to collect in the bottom of the combustion chamber whereby heat is radiated into the latter to aid in maintenance of optimum roasting conditions in the combustion chamber, withdrawing sulphur dioxide from the combustion chamber, and discharging cinder from the bottom of the combustion chamber.

15. Apparatus for roasting metal sulphide fines comprising a combustion chamber having a large horizontal dimension relative to the height and having horizontal dimensions taken at right angles substantially equal, a fines feeding conduit in the side of the combustion chamber, said conduit being upwardly inclined and opening into the combustion chamber at a point higher than the inlet end of the conduit, means for feeding fines into the inlet end of the feed conduit, means for injecting gas into the feed conduit to charge fines into the combustion chamber and cause fines to move through the combustion chamber a substantial distance in a horizontal direction and to move through the combustion chamber from substantially the top of the combustion chamber to the bottom thereof, means for passing a stream of oxidizing gas upwardly through the combustion chamber, means for discharging cinder from the bottom of the combustion chamber, and means at the top of the combustion chamber for withdrawing gaseous products of combustion.

16. Apparatus for roasting metal sulphide fines comprising a combustion chamber having a large horizontal dimension relative to the height and having horizontal dimensions taken at right angles substantially equal, means for introducing into the side of the combustion chamber sulphide fines in such manner as to cause fines particles to initially travel through the combustion chamber in a direction having a horizontal component, a hearth in the bottom of the combustion chamber on which cinder is adapted to collect, means spaced above cinder collecting on the hearth for introducing oxidizing gas into the bottom of the combustion chamber, and means for withdrawing gas from the top of the combustion chamber.

EDWIN J. MULLEN.